June 14, 1966

W. G. LIVEZEY 3,255,846

BRAKE AND CLUTCH ADJUSTERS

Filed June 24, 1964

INVENTOR.
William G. Livezey
BY
a. M. Heiter
ATTORNEY

United States Patent Office 3,255,846
Patented June 14, 1966

3,255,846
BRAKE AND CLUTCH ADJUSTERS
William G. Livezey, Indianapolis, Ind., assignor to General Motors Corporation, Detroit, Mich., a corporation of Delaware
Filed June 24, 1964, Ser. No. 377,614
6 Claims. (Cl. 188—72)

This invention relates to adjusters and more particularly to automatic wear and deflection adjusters for fluid actuated brake and clutch motors.

In fluid actuated brake and clutch motors it is desirable to maintain a predetermined running clearance between the friction surfaces during disengaged running and in addition it is desirable to maintain this running clearance at a minimum so that the piston stroke of the fluid motor and accordingly the fluid displacement of the motor necessary to effect engagement is held to a minimum. Wear at the friction surfaces increases the running clearance and therefore the piston stroke and fluid displacement necessary for engagement unless there is provided wear adjusting means to compensate for such wear. Furthermore, where one or more of the working parts of the fluid motor deflect during engagement, the amount of such deflection unless compensated for will adversely affect the ability of the wear adjusting means to restore the predetermined running clearance upon disengagement.

Many attempts have heretofore been made to provide for automatic wear adjustment and to a lesser extent to compensate for deflection of the working parts. While the devices of the prior art have proven generally satisfactory, it has been found that such devices often do not meet the required standards and have disadvantages in that they are generally complicated, require a relatively large number of parts and are costly to manufacture. In large volume production especially, the cost factor has unduly limited the availability to the general automobile buying public of this type of adjustment.

This invention is illustrated in one embodiment in a brake apply motor having a brake operating cylinder in which is slidably mounted a brake apply piston having an elongated annular groove. A radially expanding friction drag ring having an axial width less than the axial width of the annular groove is mounted in the annular groove and engages at its outer peripheral surface the brake operating cylinder. A wave spring also mounted in the annular groove abuts at its opposite sides with the drag ring and with one shoulder of the annular groove. The axial compression of the wave spring is set equal to the running clearance between the friction surfaces of the brake when the brake is disengaged and normally holds the brake apply piston in its disengaged position. The axially acting spring force of the wave spring is made greater than the sum of the drag forces of the piston and sealing means which provide a seal between the piston and brake operating cylinder, and the drag force of the drag ring is made greater than the axial spring force of the wave spring. The fluid pressure force in the brake operating cylinder acting on the piston area to apply the brake is considerably greater than the drag force of the drag ring, the piston and the sealing means. In operation the drag ring remains stationary in the brake operating cylinder as the piston is moved by fluid pressure to engage the friction surfaces and the wave spring is compressed fully and by an amount equal to the running clearance. Then when the apply pressure is exhausted the drag ring again remains stationary while the stored axial energy in the wave spring reacts on the piston to move the piston to its disengaged position restoring the running clearance. When wear occurs at the friction surfaces during engagement, the apply piston advances the drag ring to compensate for such wear, the wave spring being fully compressed, with the apply piston upon pressure exhaust being returned by the wave spring to an adjusted disengaged position to restore the running clearance.

The automatic brake adjuster of the embodiment just described is satisfactory providing there are no relatively large deflections in the brake members when the brake is engaged. Deflection does, however, in some instances approach or exceed the desired running clearance. The amount of deflection that does occur is variable and dependent on the degree of brake apply pressure.

The basis of design of a second embodiment of the invention is dependent on the fact that the apply pressure in the brake operating cylinder during exhaust decays within a finite period of time and is directly related to the decay of deflection of the brake members. In the second embodiment there is provided a small hydraulic motor wholly contained in the apply piston having a sealed vent chamber which vents both sides of the drag ring to atmosphere and a passage which connects the brake operating cylinder with a sealed motor chamber having a backing ring which abuts with the outer edge of one side of the drag ring. At initial brake disengagement the unbalanced fluid force acting on the backing ring acts to hold the drag ring against the compressed wave spring which is against the one shoulder of the annular groove and this has the effect of fixing the drag ring and wave spring to the piston during the major portion of the piston travel during disengagement and the decay of deflection of the brake members. Thus, the compression of the wave spring is maintained during most of the period of decay of the deflection and therefore the ability of the wave spring to restore the running clearance is maintained. The brake apply pressure in the motor chamber is not great enough to overcome the drag force of the drag ring and the seals during the last few thousandths of an inch of deflection travel. This distance is constant however and is compensated for by increasing the axial compression of the wave spring by this same amount. After pressure decay in the motor chamber the drag ring again engages the brake operating cylinder and the wave spring completes the retraction of the piston to restore the running clearance.

It is an object of this invention to provide in a fluid motor for a friction engaging device a new and improved automatic wear adjuster operable to compensate for wear and restore a predetermined running clearance.

It is another object of this invention to provide in a fluid motor for a friction engaging device wear adjuster means operable to compensate for wear and restore a predetermined running clearance and deflection compensating means wholly contained in the motor's apply piston operable to compensate for deflection of the motor members during engagement.

It is another object of this invention to provide an apply motor for a friction engaging device having an apply piston, a radially expanding drag ring and an axially compressible spring received between spaced shoulders on the apply piston, the capable compression of the spring being equal to the running clearance for the friction engaging device and the drag ring being responsive to adjust when wear occurs by virtue of complete compression of the spring and advancement of the apply piston so that upon disengagement the drag ring in its adjusted position provides a reaction for the spring which is then effective to retract the apply piston and restore the running clearance.

It is another object of this invention to provide in a friction engaging device an apply motor having an apply piston having a friction drag ring which normally remains stationary in the brake operating cylinder as the apply piston moves to effect engagement, a spring mounted on the apply piston bearing against the drag ring and being fully compressed by an amount equal to the running clearance during engagement with further advancement of the apply piston when wear occurs advancing the drag ring for wear compensation and a deflection compensating motor assembly carried by the apply piston operated by apply pressure and functioning to compensate for motor member deflection so that when the motor members deflect during engagement and the apply piston advances the drag ring as a result of such deflection the deflection compensating motor upon disengagement returns the drag ring in the direction of return piston travel to compensate for such deflection whereafter the spring then returns the apply piston to restore the initial running clearance.

These and other objects of the invention will be more apparent from the following description and drawing of the preferred embodiments of the invention in which.

Figure 1:
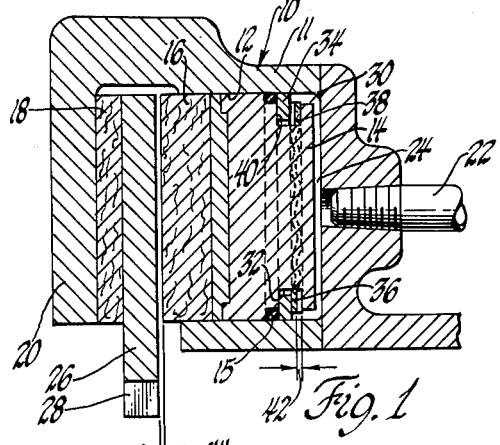
FIGURE 1 is a longitudinal sectional view of a brake apply motor employing one embodiment of the automatic adjuster of this invention with the brake being shown disengaged.

Referring now to the drawing and particularly FIGURE 1, a brake apply motor of a spot or disc brake assembly generally designated at 10 is shown as including a fixed motor housing 11 having a cylinder 12 in which is slidably mounted a brake apply piston 14 carrying a sealing ring 15.

A cylindrical friction lining or pad 16 is rigidly secured to the left-hand face of apply piston 14 and another cylindrical friction lining or pad 18 which is in axial alignment with the friction lining 16 is rigidly secured to a depending arm 20 of housing 11. Fluid pressure when supplied via a conduit 22 to a brake apply chamber 24 urges apply piston 14 leftwardly from its disengaged position shown in FIGURE 1 to its brake engaged position shown in FIGURE 2 to pack a rotating brake disc 26 which is the member to be braked between friction pads 16 and 18. Disc 26 has internal splines 28 slidably in mesh with corresponding splines provided on the member, not shown, to which the brake disc 26 is drivingly connected so as to permit the disc 26 to move axially during brake engagement.

The wear adjustment means provided to automatically adjust for wear occurring at the working friction surfaces utilize the apply piston 14 which at its right-hand end has a reduced diameter 30 having an elongated annular groove 32 in which is mounted a radially expanding friction drag ring 34 which engages the friction surface provided by cylinder 12. Also mounted in groove 32 is a wave spring 36 which abuts at its opposite sides with groove shoulder 38 and drag ring 34.

Wave spring 36 is prestressed to urge the opposite groove shoulder 40 against drag ring 34 when the brake is disengaged and has a compressible length as designated by the dimension 42 equal to the running clearance between the disc 26 and friction pads 16 and 18 as designated by the dimension 44.

The spring force of wave spring 36 is made greater than the sum of the drag forces of apply piston 14 and piston sealing ring 15 and the frictional drag force of drag ring 34 is made greater than the spring force of wave spring 36 for reasons which will become more apparent from the description of operation which follows.

Figure 2:
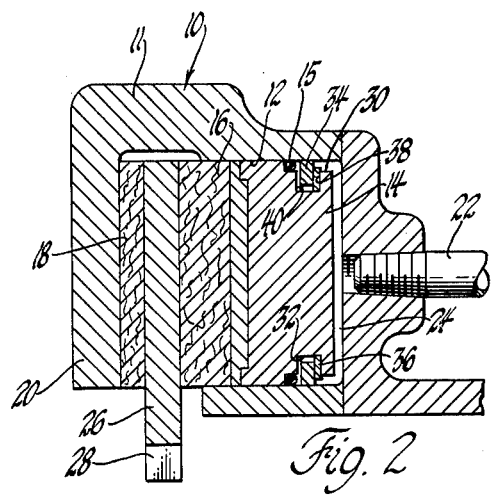
FIGURE 2 is a view similar to FIGURE 1 but showing the brake engaged.

Referring now to FIGURE 2 upon brake engagement fluid pressure is also allowed to act on both sides of drag ring 34 during initial pressure supply by virtue of the communication channel afforded by the groove 32, since wave spring 36 initially permits flow therethrough, to prevent any substantial pressure imbalance across the drag ring 34. The drag ring 34 remains stationary in cylinder 12 as apply piston 14 moves leftwardly to apply the brake and the wave spring 36 is compressed an amount equal to the running clearance. If no appreciable wear occurs drag ring 34 continues to remain stationary and when the pressure in apply chamber 24 is exhausted, the drag ring 34 provides a reaction for wave spring 36 whose stored energy then acts on apply piston 14 to return it to the right to its disengaged position as determined by groove shoulder 40 abutting with drag ring 34 restoring the initial running clearance 44.

Figure 3:
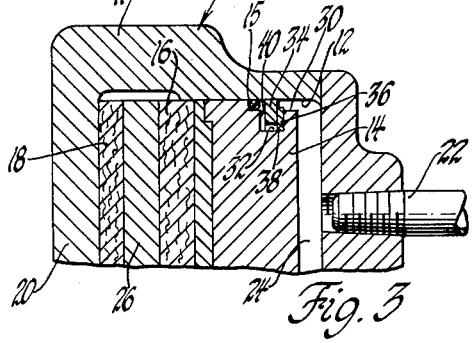
FIGURE 3 is a view similar to FIGURE 2 but showing the brake after wear has occurred.
Figure 4:
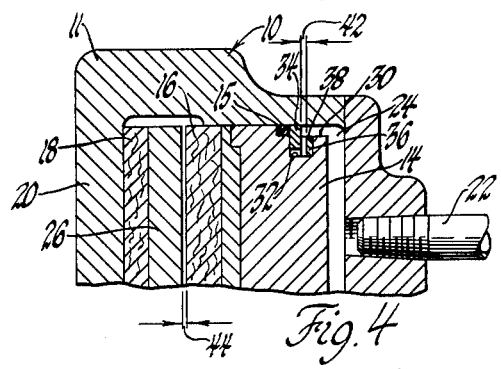
FIGURE 4 is a view similar to FIGURE 3 but showing the brake disengaged.

When appreciable wear occurs at the friction pads 16 and 18 during brake engagement, as illustrated in FIGURE 3, groove shoulder 38 is effective acting through the fully compressed wave spring 36 to advance drag ring 34 leftwardly a distance corresponding to the worn-away portions of the friction pads 16 and 18 since the piston apply force is overwhelmingly greater than the drag force of drag ring 34. Then, upon exhaust of fluid pressure in chamber 24 the drag ring 34, which has been advanced to compensate for the wear again remains stationary while the stored energy in wave spring 36 acts on apply piston 14 to return it to the right to its now adjusted disengaged position shown in FIGURE 4 which has been advanced leftwardly a distance corresponding to the worn-away portions of friction pads 16 and 18 to restore the initial running clearance 44 as before.

The embodiment shown in FIGURES 1–4 is satisfactory so long as there is no appreciable deflection in the brake members. Deflection, however, may in some instances approach or exceed the desired running clearance. The amount of deflection that does occur in the brake members is variable and dependent upon the degree of brake apply pressure. In those instances where there is considerable deflection, such as in the depending arm 20, the advancement of drag ring 34 to the left by the apply piston 14 which moves to compensate for such deflection remembering that the wave spring 36 will be fully compressed, would be the same as if wear had occurred at the friction pads 16 and 18. Then upon brake release, the return of the apply piston 14 from its advanced position due to the deflection in the depending arm 20 would relax the wave spring 36 before it has restored the predetermined running clearance. Thus, the variable amount of deflection of the depending arm 20 would be directly subtractive from the ability of drag ring 34 and wave spring 36 to restore the running clearance.

Figure 5:
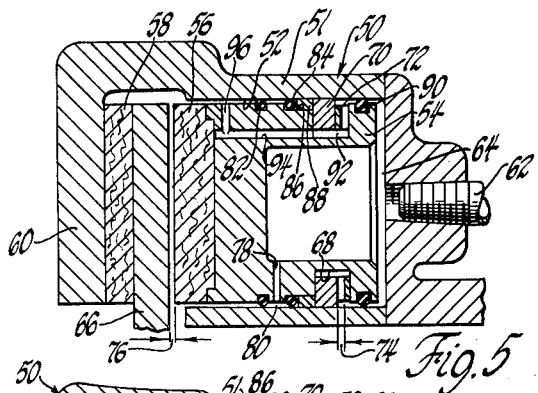
FIGURE 5 is a longitudinal sectional view of a brake apply motor employing another embodiment of the automatic adjuster of this invention with the brake being shown disengaged.
Figure 6:
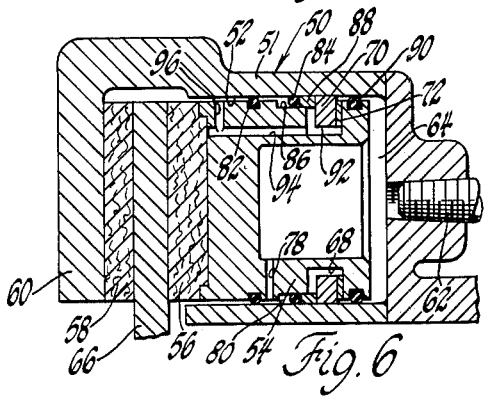
FIGURE 6 is a view similar to FIGURE 5 but showing the brake engaged with no deflection occurring in the brake members.
Figure 7:
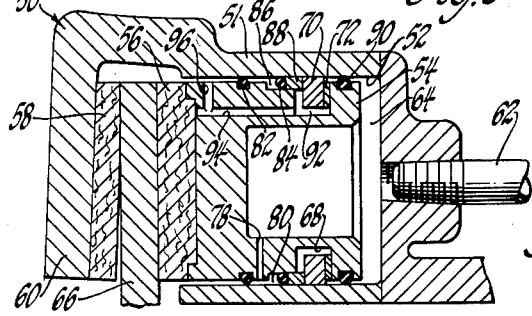
FIGURE 7 is a view similar to FIGURE 6 but showing deflection of the brake members.

The embodiment shown in FIGURES 5–7 provides compensation for the deflection of the brake members such as the deflection of the depending arm and the basis of design is dependent on the fact that the fluid pressure in the brake apply chamber decays over a finite period of time and is directly related to the decay of deflection of the brake members.

Referring to FIGURE 5 which shows the brake released, the brake apply motor generally designated at 50 has a fixed motor housing 51 having a cylinder 52 in which is slidably mounted an apply piston 54. A cylindrical friction pad 56 is rigidly secured to the left-hand face of apply piston 54 and another cylindrical friction pad 58 axially in line with the friction pad 56 is rigidly secured to the depending arm 60 of housing 51.

Fluid pressure when supplied via a conduit 62 to the brake apply chamber 64 urges the apply piston 54 leftwardly to bring about packed engagement of the friction pads 56 and 58 with a rotatable brake disc 66.

Like the embodiment shown in FIGURES 1–4, the apply piston 54 is provided with an elongated annular groove 68 in which is mounted a radial expanding friction drag ring 70 gripping the cylinder 52 and a wave spring 72 which is prestressed and has a compressible length as designated by the dimension 74 which is at least equal to or slightly larger than the running clearance 76 when the brake is disengaged as shown in FIGURE 5 for reasons which will become more apparent.

To compensate for deflection in the brake members, such as the deflection of the arm 60, there is provided a small fluid motor wholly contained in the apply piston 54 which has a passage 78 communicating the apply chamber 64 with a motor chamber 80 between apply piston 54 and cylinder 52 sealed by axially spaced seal rings 82 and 84 carried by the apply piston. The seal ring 82 is mounted in an external annular groove in apply piston 54 and the seal ring 84 is mounted in an elongated groove 86 which meets with the groove 68 containing the drag ring 70 and wave spring 72. The seal ring 84 is in abutting relationship with a backing ring 88, the latter member serving as the piston of this motor assembly and being in abutting relationship with the drag ring 70. A seal ring 90 mounted in an external annular groove of the apply piston 54 completes the sealing of a vent chamber 92 which includes the groove 68 containing drag ring 70 and wave spring 72 and this vent chamber is vented to atmosphere via connected vent passages 94 and 96.

Describing now the operation of the second embodiment, when the brake is initially engaged as shown in FIGURE 6 upon the supply of fluid pressure to chamber 64, the apply piston 54 is moved leftwardly to pack the friction pads 56 and 58 and rotating brake disc 66. As the piston 54 moves leftwardly to the position shown in FIGURE 6, the drag ring 70 remains stationary in cylinder 52 and the wave spring 72 is compressed an amount 74 equal to the running clearance 76 while at the same time, fluid pressure is being supplied from apply chamber 64 by passage 78 to the motor chamber 80 to maintain the abutting relationship between backing ring 88 and drag ring 70 during piston travel. Dependent on the degree of brake apply pressure in apply chamber 64, the depending arm 60 will be deflected during brake engagement as shown in FIGURE 7 and since the wave spring 72 is now fully compressed the apply force acting on apply piston 54 will advance drag ring 70 to the left in cylinder 52 a distance corresponding to the worn-away portions of the friction pads 56 and 58 and the deflection of arm 60. The apply pressure in motor chamber 80 acting through the seal ring 84 and backing ring 88 holds drag ring 70 against the fully compressed wave spring 72 for reasons which will become more apparent from the description of disengagement which follows.

When the brake is initially disengaged by exhausting apply chamber 64 the unbalanced fluid force on the seal ring 84, backing ring 88 and drag ring 34 assembly is an unbalanced fluid force acting rightwardly remembering that the fluid pressure on the left-hand side of this assembly is the apply pressure in motor chamber 80 at the moment of brake release, the event chamber 92 being vented to atmosphere. This unbalanced fluid force acts to hold drag ring 70 against compressed wave spring 72 and this has the effect of fixing drag ring 70 and compressed wave spring 72 to apply piston 54 during the major portion of piston travel to the right during the decay of deflection of arm 60. By fixing drag ring 70 and compressed wave spring 72 to apply piston 54 during the major portion of return piston travel, the compression of wave spring 72 is maintained during most of the period of decay of deflection of arm 60 and therefore the ability of compressed wave spring 72 to restore the initial running clearance 76 is maintained. The fluid pressure in motor chamber 80 is not great enough to overcome the drag force of drag ring 70 and seal ring 84 during the last few thousands of deflection travel and the compressible length 74 of wave spring 72 is increased by this same amount, i.e. the last few thousands of deflection travel, to compensate therefor. With drag ring 70 again gripping cylinder 52, wave spring 72 is then effective to complete the retraction of apply piston 54 to restore the initial running clearance, the deflection and wear having been compensated for by the aforementioned adjustment of drag ring 70.

While this invention has been illustrated as being employed in a spot or disc brake assembly, it will be understood that this invention is also applicable to other brake assemblies and clutch assemblies.

The above-described preferred embodiments are illustrative of the invention which may be modified within the scope of the appended claims.

I claim:
1. In an apply motor for a friction engaging device the combination of
   (a) a support structure, a first friction member rigidly secured to said support structure, a second friction member, a rotatable third friction member sandwiched between said first and second friction members, said second friction member being advanceable in one direction into engagement with said third friction member so as to urge said third friction member into engagement with said first friction member whereby relative rotation may be prevented between said first, second and third friction members,
   (b) fluid motor means supported by said support structure including a piston operable to advance said second friction member into engagement with said third friction member and said third friction member into engagement with said first friction member when said fluid motor means is supplied with fluid pressure,
   (c) a shiftable friction drag ring frictionally gripped in said motor means and abuttable on one side with said piston to determine a retracted position for said piston which provides a predetermined running clearance between said third friction member and said first and second friction members,
   (d) a spring arranged between said piston and said drag ring, said spring being prestressed to yieldingly hold said piston against said drag ring and in the retracted position and having a compressible length such that when wear occurs at said friction members said piston is effective by virtue of said spring being fully compressed as said piston travels a distance greater than said predetermined running clearance to advance said drag ring to compensate for such wear,
   (e) and deflection compensating motor means including said drag ring, a motor chamber connected to receive fluid pressure from said fluid motor means and to apply the fluid pressure to act on one side of said drag ring in a direction opposite said one direction, a vent chamber effectively connecting the other side of said drag ring to exhaust so that when said support structure is deflected as said piston is advanced to engage said friction members thereby advancing said drag ring and thereafter the fluid pressure is exhausted from said fluid motor means the decay of fluid pressure acting in said motor chamber is effective to move said drag ring conjointly with said piston during the major portion of deflection decay thereby maintaining said spring fully compressed until said friction members approach disengagement whereupon said piston is returned to an advanced retracted position by said spring so that said predetermined running clearance is restored when wear and deflection of said support structure occurs.

2. The apply motor set forth in claim 1 and said piston having an elongated annular groove, said spring being a wave spring and said drag ring and said wave spring being arranged in said annular groove.

3. In an actuator motor for a friction engaging device the combination of
   (a) motor means including a motor operating chamber, a friction surface and motor output means which is moved in one direction relative to said friction surface when fluid pressure is supplied to said motor operating chamber,
   (b) friction drag means frictionally engaging said friction surface and arranged to abut with said motor output means to determine an initial release position for said motor output means,
   (c) spring means arranged between said friction drag means and said motor output means so that when said motor output means is moved in said one direction from said initial release position to an initial apply position upon the supply of fluid pressure to said motor operating chamber, said spring means is compressed and is effective upon said motor operating chamber being exhausted to return said motor output means to said initial release position,
   (d) said motor output means when moved in said one direction beyond said initial apply position to a second apply position and subsequently to a third apply position by fluid pressure in said motor operating chamber fully compressing said spring means so that said motor output means is effective to move said friction drag means along said friction member in said one direction through a distance substantially equal to the distance between said initial apply position and said third apply position,
   (e) compensating motor means connected to said motor operating chamber arranged to apply fluid pressure supplied to said motor operating chamber to said friction drag means so that when said motor operating chamber is initially exhausted and said motor output means is forced to be moved from said third apply position to said second apply position, said friction drag means is caused by said compensating motor means to move conjointly with said motor output means during the pressure decay in said motor operating chamber thereby substantially maintaining full compression of said spring means until said motor output means reaches said second apply position,
   (f) and said spring means being effective when said motor operating chamber is exhausted to return said motor output means to again abut with said friction drag means which then determines a second release position for said motor output means which has been moved in said one direction through a distance equal to the distance between said initial apply position and said second apply position.

4. In an apply motor for a friction engaging device the combination of
   (a) motor means including a motor operating chamber, a friction surface and motor output means which is moved in one direction relative to said friction surface when fluid pressure is supplied to said motor operating chamber,
   (b) friction drag means frictionally engaging said friction surface and arranged to abut with said motor output means to determine an initial release position for said motor output means,
   (c) spring means arranged between said friction drag means and said motor output means so that when said motor output means is moved in said one direction from said initial release position to an initial apply position upon the supply of fluid pressure to said motor operating chamber, said spring means is compressed and is effective upon said motor operating chamber being exhausted to return said motor output means to said initial release position where said motor output means again abuts with said friction drag means,
   (d) said motor output means when moved in said one direction beyond said initial apply position to a second apply position and subsequently to a third apply position by fluid pressure in said motor operating chamber fully compressing said spring means whereafter said motor output means is effective to move said friction drag means along said friction surface in said one direction through a distance substantially equal to the distance between said initial apply position and said third apply position,
   (e) a compensating motor chamber connected to said motor operating chamber arranged to apply the fluid pressure supplied to said motor operating chamber to one side of said friction drag means to urge movement of said friction drag means in a direction opposite said one direction, a vent chamber effective to exhaust to atmosphere the other side of said friction drag means so that the effective pressure urging said friction drag means in said opposite direction is the fluid pressure supplied to said motor operating chamber whereby when said motor operating chamber is initially exhausted and said motor output means is forced to be moved from said third apply position to said second apply position, said friction drag means is caused by the exhausting fluid pressure in said compensating motor chamber to move conjointly with said motor output means towards said second apply position thereby maintaining substantially full compression of said spring means until said motor output means reaches said second apply position,
   (f) and said spring means being effective when said motor operating chamber and connected compensating motor chamber are exhausted to return said motor output means to again abut with said friction drag means to determine a second release position for said motor output means which has been moved in said one direction through a distance equal to the distance between said initial apply position and said second apply position.

5. In an apply motor for a friction engaging device the combination of
   (a) motor means including a housing having a cylinder, a piston slidably mounted in said cylinder and exposed to a motor chamber at one end of said cylinder, first friction means to be engaged, said piston having second friction means arranged to engage said first friction means and prevent relative movement therebetween upon movement of said piston in an engaging direction when fluid pressure is supplied to said motor chamber,
   (b) said piston having an elongated annular groove, a radially expandable friction drag ring received in said groove and gripping said cylinder, a prestressed wave spring also received in said groove and abutting on opposite sides with said friction drag ring and one shoulder of said groove so as to yieldingly hold the opposite shoulder of said groove in abutment with said friction drag ring and said piston in an initial release position to provide a predetermined running clearance between said first and second friction means,
   (c) said wave spring having a full compressible length equal to said running clearance so that when said piston is moved in said engaging direction to an initial engaging position to engage said first and second friction means upon the supply of fluid to said motor chamber, said wave spring is fully compressed and is effective to return said piston in the opposite direction to said initial release position thereby restoring said running clearance when said motor chamber is exhausted,
   (d) and said piston upon being moved by fluid pressure in said engaging direction beyond said initial engaging position to a second engaging position as a result of wear occurring at said first and second friction means fully compressing said wave spring so that said piston acts only through said fully compressed spring on said drag ring to effectively move said friction drag ring in said engaging direction along said cylinder through a distance equal to the distance between said initial engaging position and said second engaging position to compensate for such wear so that said wave spring is effective upon said motor chamber being exhausted to return said piston to again abut said opposite shoulder with said friction drag ring which then determines a second release position for said piston which has been advanced in said engaging direction through a distance equal to the distance between said initial engaging position and said second engaging position whereby said running clearance is restored.

6. In an apply motor assembly for a friction engaging device the combination of
  (a) motor means including a housing having a cylinder, a piston slidably mounted in said cylinder exposed to a motor operating chamber at one end of said cylinder, first friction means to be engaged, second friction means including friction means carried by said piston arranged to engage said first friction means to prevent relative motion therebetween upon movement of said piston in an engaging direction when fluid pressure is supplied to said motor operating chamber,
  (b) said piston having an elongated annular first groove, a radially expandable friction drag ring received in said first groove and gripping said cylinder, a prestressed wave spring also received in said first groove and abutting on opposite sides said friction drag ring and one shoulder of said first groove so as to yieldingly hold the opposite shoulder of said first groove against said friction drag ring whereby said piston is held in an initial release position to provide a predetermined running clearance between said first and second friction means,
  (c) said wave spring having a compressible length such that when said piston advances in said engaging direction through said running clearance and then further advances to accommodate for wear at said first and second friction means said piston fully compresses said wave spring so that said piston is effective to advance said friction drag ring along said cylinder in said engaging direction to compensate for such wear,
  (d) said piston having a deflection compensating motor comprising an elongated annular second groove in said piston meeting with said first groove, a piston ring received in said second groove and abuttable with one side of said friction drag ring, a deflection compensating motor chamber connected to said motor operating chamber for applying the fluid pressure supplied to said motor operating chamber to one side of said piston ring so as to urge said friction drag ring in a direction opposite said engaging direction, a vent chamber effective to exhaust to atmosphere the other side of said friction drag ring whereby the resultant force urging said friction drag ring in said opposite direction is provided by the fluid pressure supplied to said motor operating chamber so that when said motor operating chamber is initially exhausted and said piston has caused deflection in said apply motor assembly with accompanying advancement of said friction drag ring, said friction drag ring is caused by the exhausting fluid pressure in said deflection compensating motor chamber acting through said piston ring to move conjointly with said piston until the deflection is relaxed and said first and second friction means approach disengagement thereby maintaining substantially full compression of said wave spring,
  (e) and said wave spring being effective upon disengagement of said first and second friction means to return said piston to again abut said opposite shoulder with said friction drag ring which then determines an advanced release position for said piston which has been advanced in said engaging direction to compensate for wear that has occurred and restore said running clearance.

References Cited by the Examiner
UNITED STATES PATENTS

| | | | |
|---|---|---|---|
| 3,064,768 | 11/1962 | Dotto | 188—196 X |
| 3,125,187 | 3/1964 | Dotto | 188—196 X |

FOREIGN PATENTS

| | | |
|---|---|---|
| 711,405 | 6/1954 | Great Britain. |
| 934,600 | 8/1963 | Great Britain. |

MILTON BUCHLER, *Primary Examiner.*

G. E. A. HALVOSA, *Assistant Examiner.*